United States Patent Office 3,305,565
Patented Feb. 21, 1967

3,305,565
POLYEPIHALOHYDRIN PREPARATION USING FLUOBORIC ACID CATALYST
Albert C. Mueller, Berkeley, Calif., assignor to Shell Oil Company, New York, N.Y., a corporation of Delaware
No Drawing. Filed July 8, 1964, Ser. No. 381,262
2 Claims. (Cl. 260—348.6)

This invention relates to a new and improved process for polymerizing epoxy compounds. More particularly, the invention relates to a new and improved method of preparing polymers of epoxy-halo-substituted alkanes and the polyglycidyl ethers thereof whereby said epoxy-halo-substituted alkanes are polymerized in the presence of fluoboric acid catalyst and an initiator.

Polymerization products prepared by polymerizing epoxy-halo-substituted alkanes such as the epihalohydrins, etc. and the polyglycidyl ethers prepared therefrom are well known. These products have been prepared by polymerizing epoxy-halo-substituted alkanes in the presence of a great variety of catalysts. Among the catalysts heretofore used are such materials as hydrofluoric, sulfuric, phosphoric and hydroiodic acids, salts such as tin tetrachloride and boron trifluoride complexes, especially the diethyl ether complex.

The use of these catalysts heretofore, hoewver, has resulted in side reactions during the polymerization apparently causing the formation of epihalohydrin cyclic dimers, and olefins or allylic halide end groups. These side reactions thus lessen the number of terminal halohydrin groups in the polymer which is formed, thereby lowering the number of epoxide end groups derived therefrom via dehydrohalogenation. When the epoxy-halo-substituted alkanes are polymerized in the presence of initiators containing two or more hydroxyl groups per mol the resultant epoxide prepolymers derived therefrom may be cured with difunctional coreactants, such as diphenols, dithiols, dicarboxylic acids, disecondary amines, etc. to form high molecular weight products possessing both high tensile strengths and high ultimate elongations. Therefore, polymerizations wherein side reactions occur which will lower the ultimate epoxide functionality result in inferior products. Additionally, it has been found that polymerizing epoxy-chloro-substituted alkanes using the known catalysts results in materials having relatively low molecular weights (below about 1000).

It is an object of this invention to provide an improved process for preparing polymers of epoxy-halo-substituted alkanes of higher molecular weights than heretofore generally possible and having a high degree of linearity and a greater percentage of terminal halohydrin groups available for dehydrohalogenation to polymers having a higher number of terminal epoxide groups. These and other objects of the invention will be apparent from the following detailed description thereof.

In accordance with this invention epoxy-halo-substituted alkanes are polymerized in the presence of fluoboric acid catalyst and a controlled amount of initiator in a solvent medium. The resulting polymers are then treated with an alkaline material to convert the terminal halohydrin groups to the corresponding epoxy groups thereby resulting in polyglycidyl ethers of the formula (where water initiator is used)

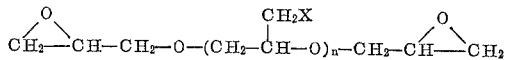

wherein X is a halogen (preferably chlorine or bromine) and the average of n is an integer between 5 and 30.

The expression epoxy-halo-substituted alkanes as used herein refers to those alkanes having a vic-epoxy group, i.e., a

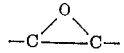

group, attached directly to a halogen bearing carbon atom, such as, for example, epichlorohydrin, epibromohydrin, 1,4-dichloro-2,3-epoxybutane, 1-chloro-2,3-epoxypentane and the like. Especially preferred are the epoxy-halo-substituted alkanes containing no more than 12 carbon atoms, and preferably from 3 to 8 carbon atoms.

According to the process of the invention, the above-described epoxy-halo-substituted alkanes are treated with fluoboric acid catalyst in the presence of a controlled amount of initiator to form a halohydrin polymer.

Where polymers having more than one terminal halohydrin group per molecule are to be prepared the initiators used in the polymerization of epoxy-halo-substituted alkanes are hydroxy-containing compounds such as water, and polyhydric aliphatic or aromatic alcohols. Suitable alcohols include polyhydric aliphatic, cycloaliphatic, and aromatic alcohols having from 1 to about 18 carbon atoms. Some specific examples are, for example, polyhydric alcohols such as ethylene glycol, propylene glycol, isobutylene glycol, trimethylene glycol, glycerol, sorbitol, pentaerythritol, trimethylol propane, glycidol, polymeric polyhydric alcohols such as the polyethylene glycols, polypropylene glycols and polybutylene glycols, substituted alcohols such as glycerol monochlorohydrin, and polyhydroxyphenolic compounds having two or more hydroxyl groups attached to one or more benzene rings. The latter hydroxy compounds include, for example, bis(2,2'-dihydroxyphenyl)methane, 2,3-bis(2-hydroxyphenyl)propane, 2,2-bis(4-hydroxyphenyl)propane, and the like. Water and 1,2-dihydroxy-3-chloropropane or 1,3-dihydroxy-2-chloropropane are especially preferred.

However, the polymerization reaction may also be initiated with monohydric aliphatic or aromatic alcohols which will result in the production of polymers having only one terminal halohydrin group per molecule. Examples of monohydric initiators which may be used are, for example, methyl alcohol, ethyl alcohol, isopropyl alcohol, isobutyl alcohol, cyclopentyl alcohol, allylalcohol, crotyl alcohol, ethylene glycol monoethyl ether, ethylene glycol monobutyl ether, diethylene glycol monoethyl ether, phenol, cresol, butyl phenol, etc.

The process according to this invention is preferably carried out in the presence of a suitable inert organic solvent. The use of a solvent provides for more efficient mixing of the reaction materials and ease in maintaining exothermic control of the reaction mixture itself. Although the amount of solvent present is not critical, up to about 200 parts per 100 parts by weight of epoxy-halo-substituted alkane is generally sufficient. Solvents which may be used include ethylene dichloride, methylene dichloride, dioxane, diethyl ether, benzene, toluene, etc.

It is an especially preferred feature of this invention to add the epoxy-halo-substituted alkanes in small increments into the mixture containing the fluoboric acid catalyst, initiator and solvent material. The epoxy-halo-substituted alkane may be added dropwise into a well stirred mixture of fluoboric acid and initiator suspended in the solvent which has been preheated to the desired temperature. When the epihalohydrin content is maintained at a low level by a slow addition thereof to the solvent-catalyst-initiator system, a much higher degree of polymerization results as compared to a polymerization wherein a large amount of the monomer is present in the reaction mixture as would be the case when the fluoboric acid is added to a mixture of the epoxy-halo-substituted alkane, initiator and solvent or when the epoxy-halo-substituted alkane, the initiator and the fluoboric acid are all combined at the beginning of the polymerization. In addition, the resulting polymeric epoxy-halo-substituted alkane produced by the preferred method will generally have a greater percentage of terminal halohydrin groups which in turn after dehydrohalogenation will give a higher yield of the corresponding epoxy groups.

The ratio of epoxy-halo-substituted alkanes to initiator employed in the reaction is critical. There should be a total amount of at least 4 moles and preferably from 4 to about 40 moles of the epoxy-halo-substituted alkane used in the reaction per mole of initiator present within the reaction mixture. Thus, the amount of initiator used will be no greater than 0.25 mol percent and preferably between 0.25 and 0.025 mol percent of the epoxy-halo-substituted alkane. The exact ratio selected will depend on the molecular weight of the polymer desired, a higher ratio of epoxy-halo-substituted alkane to initiator resulting in a higher molecular weight polymer.

The temperature used in the polymerization reaction is between about −30° C. and about 90° C. The temperatures in the range of about 30° to about 60° C. are preferred. It may be desirable to preheat the solvent composition containing the initiator and fluoboric acid catalyst to the desired reaction temperature prior to the addition of the epoxy-halo-substituted alkane. The polymerization reaction is exothermic and thus the reaction temperature is readily maintained by the controlled rate of monomer addition. The time of the reaction may be from about 1 hour to about 48 hours. The epoxy-halo-substituted alkanes may be added as rapidly as possible providing exothermic control is not lost. Following the polymerization the catalyst may be precipitated with an equivalent amount of an alkaline reagent such as, for example, concentrated aqueous ammonia which will form the insoluble salt $NH_4BF_4$. The precipitated catalyst may then be filtered out and the polymer recovered upon vacuum stabilization of the solvent.

The polymers formed by the above method will comprise halo-methyl-substituted polyhydroxy-substituted polyethers, which in the case of epichlorohydrin with water as initiator will have the following structure

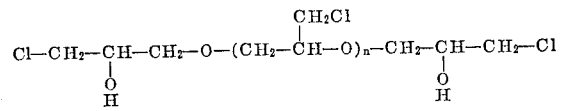

wherein the average of $n$ is an integer from 5 to 30. The polymers will vary from fluid liquids to thick semi-solids, depending on the value of $n$. It is understood that where another initiator is used, a corresponding radical derived therefrom will be present within the polymer structure. The resulting polymer, having thereon terminal halohydrin groups, is treated with a suitable alkaline material thereby dehydrohalogenating the halohydrin groups to the corresponding epoxide groups. The dehydrohalogenation reaction may be accomplished by adding the alkaline reactant directly to the reaction mixture used in preparing the polymers or the polymer may be recovered before it is combined with the alkaline reactant.

Any of the known dehydrohalogenation materials may be used in this manner. Suitable materials include, for example, alkali or alkaline earth metals such as sodium and potassium hydroxide, sodium and potassium carbonates, and bicarbonates, hydroxides of magnesium, zinc, lead, iron and aluminum, and the corresponding oxides, etc. The aluminates, silicates and zincates of alkali salts, such as sodium and potassium aluminate and sodium and potassium zincate, are particularly good dehydrohalogenation agents when used in substantially, or completely, non-aqueous media.

The amount of dehydrohalogenating agents used may vary over a considerable range. Where all of the halohydrin groups are to be converted to epoxy groups, the polyhalohydrin should be reacted with an amount of the alkaline material which is at least equivalent to the halohydrin content of polymer. Thus, approximately 1–2 moles of the alkaline material per mole of polyepihalohydrin will be necessary to convert all of the halohydrin groups of the polymer to epoxy groups depending on the number of terminal halohydrin groups. In most cases, the alkaline material may be applied to the halohydrin as an aqueous solution or as a suspension in an inert solvent, such as ethers, aliphatic, cycloaliphatic and aromatic hydrocarbons, halogenated hydrocarbons, and the like. If the alkaline material is an aluminate, silicate or zincate, the dehydrohalogenation is preferably effected in an non-aqueous medium and the salts are suspended in organic solvents or diluents. Carbon tetrachloride, 1,4-dioxane and dichloroethyl ether are particularly satisfactory as solvents for this purpose. Dehydrohalogenation of the terminal halohydrin groups in the polymer is also readily achieved by the use of alcoholic potassium hydroxide, at room temperature. In most cases, the dehydrohalogenation reaction may be accomplished at temperatures preferably ranging from about 20° C. to 150° C. and more preferably from about 25° C. to about 80° C.

At the end of the dehydrohalogenation reaction period, the reaction mixture may be filtered through a suitable filtering medium, e.g., diatomaceous earth, to remove any alkali metal halide and any excess catalyst. The filtrate may then be treated to recover the epoxide. If the reaction has been conducted in the presence of water, care should be taken to avoid hydrolysis of the epoxide groups during the separation process. This can be accomplished by various extraction or distillation methods using subatmospheric pressures and conditions unfavorable to hydrolysis of the epoxide groups. Separation may be conveniently effected by treating the aqueous reaction mixture in a continuous extraction apparatus wherein any suitable extractants such as an ester, alcohol, ether, hydrocarbon, etc., may be utilized. The extracted epoxide may be separated from its solution with the extractant by subjecting the preferably anhydrous solution to distillation or fractionation operation.

In the case where the dehydrohalogenation reaction has been conducted in the absence of water, but in the presence of solvents, the product may be recovered by any suitable method, such as distillation, extraction, and the like.

The preferred products prepared according to the invention are the polyether polyepoxides. These products are fluid or viscous liquids to semi-solids having more than one epoxy group per molecule and possessing a high percent, at least 25%, and preferably above 30% by weight of halogen, such as chlorine. The polyether polyepoxides are soluble in most solvents, such as ketones, alcohols and liquid hydrocarbons, and are compatible with many synthetic oils and resins.

For certain applications, such as in the preparation of surface coatings, fibers or filaments, it may be sometimes desirable to have products of still higher molecular weights. Such products may be obtained by reacting the above described polyepoxy polyethers with polyhydric compounds, such as polyhydric phenols, polynuclear phenols, dithiols, dicarboxylic acids, disecondary amines, etc. Polyhydric phenols that may be used for this purpose include, among others, resorcinol, catechol, hydroquinone, methyl resorcinol, and polynuclear phenols, such as 2,2-bis(3-hydroxyphenyl)propane, 2,2-bis(4-hydroxyphenyl)propane, 2,2-bis(4-hydroxyphenyl)butane, 2,2-bis(4-hydroxy-3,5-dimethylphenyl)propane, and the like. In case the polyhydric material employed is a polyhydric phenol, the reaction may generally be accomplished by merely heating the polyether polyepoxides with the phenol. In the case of the other polyhydric materials, such as polyhydric alcohols, the reaction may be quite slow in which case it is advisable to employ a catalyst, such as acidic materials used by the prior art for the polymerization of an epoxy-halo-substituted alkane as disclosed herein.

The preferred polyepoxy materials prepared according to this invention and their higher molecular weight derivatives produced by reacting the polyepoxide materials prepared with the difunctional coreactants, i.e., diphenols, dithiols, dicarboxylic acids, disecondary amines, etc. as described above may be polymerized alone or with other polyepoxide materials in a variety of different proportions, such as, with amounts of other polyepoxides varying from 5% to 95% by weight to form valuable polymeric products. Other polyepoxides that may be copolymerized with the polyether polyepoxides prepared according to the process in this invention, include, among others, glycidyl polyethers of polyhydric phenols obtained by reacting polyhydric phenols such as bis-phenol, resorcinol and the like with an excess of chlorohydrin, such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyether polyepoxides obtained by reacting a polyhydric alcohol or polyhydric phenol with any of the above-described polyepoxides. The glycidyl polyethers or polyhydric phenols obtained by condensing the polyethers of polyhydric phenols with epichlorohydrin as described above are also referred to as "ethoxyline resins." See Chemical Week, vol. 69, page 27, for September 8, 1951.

A great variety of different curing agents may be employed in effecting the above described homo and co-polymerization reactions. Such agents include, among others, carboxylic acids or anhydrides, such as oxalic acid, phthalic anhydride; Friedel-Crafts metal halides, such as aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; amino compounds, such as triethylamine, ethylene diamine, diethylamine, diethylene triamine, triethylene tetramine, dicyandiamide, and melamine; and salts of inorganic acids, such as zinc fluoborate, potassium persulfate, nickel fluoborate, copper fluoborate, selenium fluoborate, magnesium fluoborate, tin fluoborate, potassium perchlorate, cupric sulphate, cupric phosphate, cupric phosphite, magnesium arsenate, magnesium sulphate, cadmium arsenate, cadmium silicate, aluminum fluoborate, ferrous sulphate, ferrous silicate, manganese hypophosphite, nickel phosphate and nickel chlorate.

The amount of curing agents employed may vary over a considerable range depending upon the agents selected. With curing agents having replaceable hydrogen, such as the amine agents, amounts of agent employed vary up to and including equivalent proportions, i.e., sufficient curing agent to furnish a replaceable hydrogen atom for every epoxy group to be reacted. In most cases, satisfactory cures are obtained with amounts varying from 1% to 25% by weight of the material being polymerized. With the phosphoric acid and esters, particularly preferred amounts vary from about 3% to 20% by weight. The other curing agents are preferably employed in amounts varying from 1% to 20%.

The high molecular weight products may also be cured through the hydroxy group by the addition of appropriate amounts, e.g., 1% to 25% by weight of polybasic acids or anhydrides, polyisocyanates, and the like.

The curing is preferably effected by mixing the curing agent with the polyepoxide and adding the mixture together, preferably at temperatures ranging from about 40° to 200° C. Solvent or diluents may be employed in the polymerization depending upon the intended application of the polymer and ease of operation of the polymerization reaction.

If the polyether polyepoxides and their higher molecular weight derivatives are to be used in the preparation of castings or pottings, the curing agent and the epoxy materials are generally combined together and then poured into the desired mold or form containing the electrical wires or apparatus and the mixture heated to effect the cure.

The polyether polyepoxides and their higher molecular weight derivatives may also be employed with the aforedescribed curing agents to prepare improved surface coating compositions of the air-drying or baking type. In utilizing the products for this application, it is generally desirable to combine the epoxy material and curing agent with the desired solvents, and if desired, other film-forming materials and driers, and then applying the resulting mixture to the surface to be coated. Film-forming materials that can be used with the epoxy material in this manner include the drying oils, such as tung oil, linseed oil, dehydrated castor oil, soybean oil, and the like; cellulose derivatives such as cellulose nitrate, cellulose acetate, cellulose acetate butyrate, cellulose propionate, ethyl cellulose, and mixtures thereof; and vinyl polymers such as polymers of vinyl chloride, vinylidine chloride, methyl methacrylate, diallyl phthalate, etc. The coatings prepared in this manner may be allowed to set to a hard finish at room temperature or heat may be applied to hasten the cure.

The polyether polyepoxides prepared according to this invention may also be employed with the curing agents to prepare valuable adhesive compositions. In utilizing the products for these applications it is generally desirable to combine the epoxy material alone or with other epoxy resins with conventional fillers and curing agents and then to use the spreadable fluid as adhesive for materials such as wood, plastic, metal, and the like. The liquid polyether polyepoxides are particularly suited for use in preparing coating compositions as described above, as they may be combined with conventional liquid grade glycidyl ethers of polyhydric phenols (e.g., Epon resins) and used without solvents to form solventless varnishes which cure to form hard, solvent resistant films.

In the particularly useful applications the polyether polyepoxides are employed to impart self-extinguishing characteristics to laminates, particularly paper laminates. The polyether polyepoxides may be combined with the conventional liquid polyepoxides, fillers and curing agents and in particular for the best flame resistant characteristics some antimony oxide will be added. The mixture is made up as a liquid, suitably by use of a diluent such as monoepoxide, e.g., allyl glycidyl ether, and the laminate prepared in otherwise conventional manner.

In addition, the epoxy ethers may be used as stabilizing agents for various halo-containing polymers, and particularly the vinyl halide polymers. These products may be used as stabilizers, alone or in combination with other stabilizing agents, such as urea and thiourea derivatives. In most cases, the products are effective as stabilizers in amounts varying from about 1% to 5% by weight of the polymer being stabilized. The epoxy materials may be combined with the halogen containing polymer by any suitable method, such as by dissolving products in a suitable solvent or by milling the products together on a suitable roll mill.

They may also be used as secondary plasticizers in combination with plasticizers, such as dioctyl phthalate, and the like.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are given by weight.

EXAMPLE I

Epichlorohydrin (0.54 moles) was added dropwise into a well stirred mixture of fluoboric acid catalyst (0.42 part per 100 parts epichlorohydrin) and 0.028 mole of water initiator (mole ratio epichlorohydrin:water of 19:1) suspended in methylene dichloride which had been preheated to 35–40° C. Heat of the exothermic polymerization maintained a steady solvent reflux at 41 to 42° C. without loss of catalyst activity and monomer buildup throughout the entire reaction. Epichlorohydrin addition was as rapid as possible without loss of exothermic control. The amount of methylene dichloride solvent present was 130 moles per 100 moles epichlorohydrin. The reaction was allowed to continue for 8 hours. The catalyst was then precipitated with concentrated aqueous ammonia as $NH_4BF_4$ at the end of the reaction, filtered out and the polymer recovered upon vacuum stabilization of the methylene dichloride solvent. The polymeric product was found to have an average of 1.8 chlorohydrin groups/mole. The epichlorohydrin polymer having chlorohydrin terminal groups was then dehydrochlorinated to the corresponding glycidyl ether with alcoholic potassium hydroxide in excess of that required to convert all of the chlorohydrin groups to epoxy groups in ethylene dichloride solution. The excess alkali was neutralized with $CO_2$ and the KCl, $K_2CO_3$ removed by filtration. Final stabilization removing solvent and water in vacuo yielded a nearly colorless, clear viscous resin. The resulting polymer was characterized by an average molecular weight of 1540 (±50) and had an average number of 1.8 epoxide groups per mole. Theoretical molecular weight was calculated to be 1870.

EXAMPLE II

The polymerization procedure as set forth in Example I was repeated using 1.625 moles epichlorohydrin and .14 part fluoboric acid catalyst per 100 parts epichlorohydrin. 0.18 mole water initiator and 110 parts methylene dichloride solvent was used in the reaction which had a temperature of 45 to 50° C. The reaction time was about 6 hours. The mol ratio of epichlorohydrin to water was about 9:1. The polymer produced had an average molecular weight of 810 (±15) and an average chlorohydrin content of 1.8 groups per mol. Theoretical molecular weight was calculated to be 870.

EXAMPLE III

The procedure as set forth in Example I was repeated utilizing 10.8 moles epichlorohydrin with 0.5 mole fluoboric acid catalyst and 0.55 mole water (mole ratio of epichlorohydrin:water of about 20:1). Methylene dichloride solvent was present in 100 parts per 100 parts epichlorohydrin. The reaction temperature was 40° to 45° C. and was allowed to continue for 5 hours. The polymer recovered had an average molecular weight of 1580 (±30) and had an average number of 1.87 chlorohydrin groups per mole. Theoretical molecular weight was calculated to be 1800.

In order to show the particular criticality and advantages afforded by the stepwise process as set forth in the examples above whereby the epichlorohydrin monomer is added slowly to the suspension of fluoboric acid catalyst in water in methylene dichloride solvent the following example is presented.

EXAMPLE IV

Fluoboric acid (0.40 part/100 parts epichlorohydrin) was added in small increments to a methylene dichloride solvent containing 0.54 mole epichlorohydrin and 0.028 mole water (mole ratio of epichlorohydrin:water of 19:1). The methylene dichloride solvent was present in 125 parts per 100 parts of epichlorohydrin. The reaction temperature was 45 to 50° C. and allowed to continue for about 8 hours. The polymer was found to contain an average of 0.93 chlorohydrin group/mole. The polyepichlorohydrin was dehydrochlorinated in the same manner outlined in the examples above. The resulting polymer had a molecular weight of 835 (±15) and contained 0.93 average epoxy group per mole of polymer. The theoretical molecular weight was calculated to be 1800.

Thus, the advantages provided in the process of the invention whereby the epihalohydrin monomer is slowly added to the solution of catalyst and initiator is readily seen.

I claim as my invention:

1. A process for preparing a polyglycidyl ether which comprises adding an epoxy-halo-substituted alkane in small increments to a mixture of fluoboric acid catalyst and an initiator selected from the group consisting of water and an alcohol in the presence of an inert organic solvent medium wherein said fluoboric acid catalyst is present in an amount of from about 0.1 to about 5% by weight based on the total amount of epoxy-halo-substituted alkane and the mol ratio of epoxy-halo-substituted alkane to initiator is from 4:1 to about 40:1 to form an epoxy-halo-substituted alkane polymer and thereafter treating said polymer with an alkaline material in excess of that required to convert the halohydrin groups to the corresponding epoxy groups.

2. A process for preparing a polyglycidyl ether having the formula

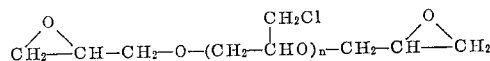

wherein $n$ is an integer the average of which is between 5 and 30, comprising adding epichlorohydrin in small increments to a mixture of fluoboric acid catalyst and water in an inert organic solvent medium, wherein fluoboric acid catalyst is present in an amount of from about 0.1 to about 5% by weight based on the total amount of epoxy-halo-substituted alkane and the mole ratio of epoxy-halo-substituted alkane and the mole ratio of epoxy-halo-substituted alkane to water is from 4:1 to about 40:1, to form an epoxy-halo-substituted alkane polymer and thereafter treating said polymer with an alkaline material in excess of that required to convert the halohydrin groups to the corresponding epoxy groups.

References Cited by the Examiner

UNITED STATES PATENTS

| | | | |
|---|---|---|---|
| 2,260,753 | 10/1941 | Marple et al. | 260—348.6 |
| 2,891,073 | 6/1959 | Smith | 260—340.2 |
| 3,129,232 | 4/1964 | Terford et al. | 260—348.6 |

WALTER A. MODANCE, *Primary Examiner.*

NORMA E. MILESTONE, *Assistant Examiner.*